United States Patent Office 3,822,317
Patented July 2, 1974

---

3,822,317
CERTAIN ETHER PEROXIDES DERIVABLE FROM α-SUBSTITUTED VINYL ETHERS
Antonio Joseph D'Angelo, Wilbur H. McKellin, and Orville Leonard Mageli, Buffalo, N.Y., assignors to Pennwalt Corporation
No Drawing. Filed Oct. 10, 1966, Ser. No. 585,296
Int. Cl. C07c 73/00
U.S. Cl. 260—610 R
5 Claims

ABSTRACT OF THE DISCLOSURE

The invention concerns ether peroxides having an ether oxygen and a peroxy group oxygen attached to a common carbon atom, that is:

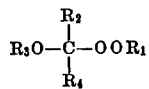

where the R's are specified hydrocarbon radicals. Examples are: 2-methoxy - 2 - cumylperoxy propane; 1-methoxy - 1-$t$-butylperoxy - 3,3,5-trimethylcyclohexane; 2-methyl - 2 - $t$ - butylperoxy-tetrahydropyran; and 1,3,5-tris[alpha(2 - ispropoxy - 2 - propylperoxy)isopropyl] benzene.

---

This invention relates to novel ether peroxides having an ether oxygen and a peroxy group oxygen attached to a common carbon atom.

The novel ether peroxides of the invention have the formula:

I.
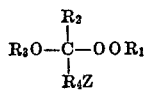

where $R_1$, $R_2$, $R_3$, $R_4$ and Z are radicals having the following identities:

(a) $R_1$ is aliphatic, cycloaliphatic, or

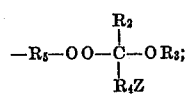

(b) $R_2$, $R_3$ and $R_4$ are aliphatic, cycloaliphatic or aromatic;
(c) $R_5$ is aliphatic or cycloaliphatic;
(d) Z is H; and
(e) C, $R_2$ and —$OR_3$ together, or C, $R_2$ and $R_4Z$ together, may form a ring.

Herein "peroxy" or "dioxy" refers to the "—OO—" group and "hydroperoxy" refers to the "—OOH" group.
In all instances the numerical subscript following "R" is being used as an identification tag only and is not intended to indicate the presence of more than one of said R's.

A need exists for radical initiators operable in the peroxyester temperature range but which do not contain carbonyl groups. Carbonyl residues on polymer chains have been considered to be the cause of poor light and oxidative stability in several commercial polymers.

Several resin manufacturers have expressed an interest in the possibility of using a dialkyl peroxide that would have a half-life near that of $t$-butyl perbenzoate. Three unsymmetrical dialkyl peroxides were prepared; they were too thermally stable to be replacements for peroxyesters.

The diperoxyketals have half-lives in the peroxyester range but are reported to be very shock sensitive. The preparation of peroxyketals was patented by Shell in 1946 but the compounds were never offered on a commercial scale presumably because of their hazardous nature.

The principal object of this invention is to provide peroxides which have substantially the effectiveness of commercial peroxyesters, e.g., $t$-butyl perbenzoate.

Broadly, this object has been attained by the discovery of the ether peroxides I as defined above. It is preferred that $R_1$ be an aliphatic hydrocarbon radical joined to the —OO— group through a tertiary carbon atom, for example, $t$-butyl, $t$-pentyl and cumyl. It is preferred that $R_2$ and $R_3$ be lower alkyl having 1–8 carbon atoms, for example, methyl and isopropyl.

The ether peroxides I of the invention have been defined very broadly in terms of R and Z; however it is to be understood R and Z are not critical to the ability of the compounds to be made or to the utility of the compounds as radical initiators for polyester curing or other reactions promoted by peroxyester and peroxides.

α-sub vinyl ethers

Some ethers of this type needed for use in the Ropp process for preparing compounds of the invention are available commercially. Many methods for preparing these ethers are known, for example.

1. Armitage, D. and Wilson, C., J. Am. Chem. Soc., *81* 2437 (1959).
2. Ansell, M. and Thomas D., J. Chem. Soc., 1163 (1958).
3. Trubnikov, I. and Pentin Yu., Zh. Obsch. Khim., *32*, 3590 (1962).
4. Winstein, S. and Ingraham, L., J. Am. Chem. Soc., *77*, 1741 (1955).
5. Dolliver, M., Gresham, T., Kistiakowsky, G., Smith, E., and Vaugh, W., J. Am. Chem. Soc., *60*, 440 (1938).
6 The commercial base-catalyzed addition of alcohols to acetylenes.
7. The catalytic cracking of ketals over acid catalysts such as hydrogen chloride, sulfonic acid, and p-toluene sulfonic acid.

Preparation of α-sub cyclic vinyl ether 1-Methoxy-3,3,5-trimethylcyclohexene

Here the ketal was not isolated but converted directly to the unsaturated ether.

A two-liter round bottom flask was equipped with a two-foot helices-packed column and a variable reflux take-off head. Attached to the take-off head thermometer was the "Thermocap" relay used to activate a "Flexopulse" timer set at a 10 to 1 reflux ratio.

In a 500 ml. flask was placed 70 g. (0.5 mole) of 3,3,5-trimethylcyclohexanone, 52 g. (0.5 mole) of 2,2-dimethoxypropane, 32 g. (1.0 mole) of methanol, 100 g. of cyclohexane and 0.1 g. of p-toluenesulfonic acid. The "Thermocap" relay was set at 52°, the boiling point of the acetone-methanol-cyclohexane ternary azeotrope.

When the vapor temperature could not be kept at 52°, the "Thermocap" was disconnected and distillation continued at 10 to 1 reflux ratio. The bath temperature was raised slowly to 190° (temperature of vapor never rose above 56°). When no further distillate came over, the oil bath was removed, the pot residue allowed to cool and sodium methoxide was added to neutralize the catalyst.

The pot residue was then distilled under reduced pressure through a 15 inch Vigreux column giving 71.5 g. of 1-methoxy-3,3,5-trimethylcyclohexene, boiling at 62–64° at 13 mm. pressure, $n_D^{25°}$=1.4508. The weight yield was 90.4% but analysis by vapor phase chromatography showed the presence of 9.6% ketone in the ether. The true yield was 82.5%.

All temperatures are degrees, Centigrade. The material was used "as is" in subsequent reactions with no deleterious effects.

Preparation of Compounds of the Invention

Compounds of this invention can be made by at least two published procedures: Kharasch and Fone, *J. Org. Chem.* 23 324 (1958) and Ropp, U.S. Patent No. 2,776,319 (Jan. 1, 1957). It is preferred to use a new method which is disclosed in U.S. patent application Ser. No. 585,295 filed Oct. 10, 1966 by Richard Anthony Bafford, Leonard Ernest Korczykowski and Orville Leonard Mageli.

Illustration A

This preparation by the method of Korasch-Fono was carried out under nitrogen in a four-necked round bottomed flask equipped with stirring, dropping funnel, reflux condenser and thermometer.

A 10% solution of cobalt octoate (6%) in benzene was used as catalyst.

Reaction of isopropyl ether with *t*-butyl hydroperoxide

To a well stirred mixture of 208 g. isopropyl ether (2 mole), 800 ml. of benzene and 390 drops of cobalt catalyst heated at 70±1° C. was added dropwise over a period of three hours, 400 g. of t-butyl hydroperoxide 90%. The mixture was allowed to reflux for 24 hours. At the end of this time the mixture was filtered off and the solvent evaporated under reduced pressure. The residue was diluted with pentane and washed with 10% NaOH solution.

The pentane layer was washed to neutral dried over anhydrous MgSO₄, filtered and the solvent evaporated under reduced pressure. A yield of 24 g. was obtained.

Purification by vapor phase chromatography (VPC) gave two products:

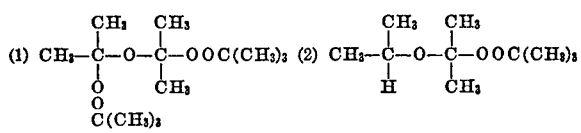

For (1): Theoretical (percent): C, 60.37; H, 10.87.
Found (percent): C, 60.22; H, 10.99.

For (2): Theoretical (percent): C, 63.25; H, 11.58.
Found (percent): C, 63.45; H, 11.91.

These compounds of this invention have been named:
(See (1) and (2) on page 7.)

Illustration B

The method of Ropp was used. Methyl isopropenyl ether was added to a cold (0–5°) ethereal solution of *t*-butyl hydroperoxide and a catalytic quantity (one drop) of concentrated sulfuric acid. The reaction is exothermic and the temperature was controlled by the rate of addition of the vinyl ether and external cooling. The mixture was then stirred several hours although it is very likely that the reaction is very fast. The reaction mixture was washed with 10% potassium hydroxide to destroy the catalyst and to remove any excess hydroperoxide. The ethereal solution was then washed with water, dried over sodium sulfate and stripped in vacuo.

(1) Bis (2,2-*t*-butylperoxy) diisopropyl ether.
(2) 2-isopropoxy-2-*t*-butylperoxy propane.

The active oxygen assays were consistently greater than theoretical even though unreacted hydroperoxide was completely absent from the products. It was at first believed that the fault lay with the assay method. A sample of 2-methoxy-2-*t*-butylperoxy propane was distilled under reduced pressure through a short column. Although the material distilled over a narrow range, a VPC scan at 80° on a 6 foot diisodecyl phthalate on 60–80 WAW810 column showed two sharp bands one at 13.7 min., the other at 40.4 min. By careful fractionation, two fractions were separated. Fraction B distilled at 36–41° at 4–5 mm.; $n_D^{25}$ 1.3995; active oxygen 10.07% (theory for 2-methoxy-2-*t*-butylperoxy propane 9.87%).

Fraction A distilled at 44–46° at 4–5 mm.; $n_D^{25}$ 1.4063; active oxygen 14.2% (theory for 2,2-bis-*t*-butylperoxy propane 14.5%). That fraction A was 2,2-bis-*t*-butylperoxy propane was established by the synthesis of an authentic sample from acetone and *t*-butyl hydroperoxide (its properties; active oxygen 14.3%; $n_D^{25}$ 1.4064). The infrared spectrum of fraction A and authentic 2,2-bis(*t*-butylperoxy) propane were superimposable.

The compounds of the invention which are of special interest because of their structure are illustrated:

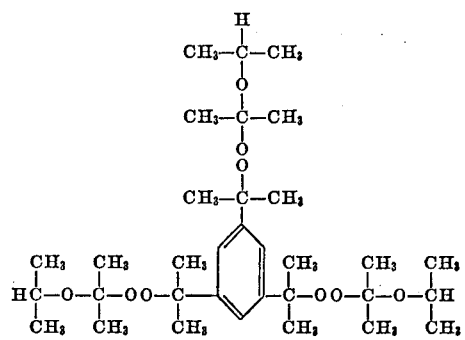

Named: 1,3,5-tris[α(2-isopropoxy-2-propylperoxy)isopropyl]benzene.

Many ether peroxides of the invention were prepared. In some preparations, the product was not separated to obtain the essentially pure ether peroxide, as shown by an active oxygen [A.O.] assay over 100%. These ether peroxides are listed in Table 1.

TABLE 1

| Ether peroxide | $n_D^{25}$ | Yield, percent | [A.O. assay], percent |
|---|---|---|---|
| 1. 2-methoxy-2-t-butylperoxy propane | 1.4022 | 75 | 113 |
| 2. do | ª 1.3971 | ᵇ 72 | 98.1 |
| 3. 2-ethoxy-2-t-butylperoxy propane | ᶜ 1.4020 | 85 | 125 |
| 4. do | | | |
| 5. 2-isopropoxy-2-t-butylperoxy propane | 1.3980 | 91 | 97.4 |
| 6. 2-isobutoxy-2-t-butylperoxy propane | 1.4023 | 99.5 | 95 |
| 7. 2-methoxy-2-cumylperoxy propane | 1.5001 | 85 | 105 |
| 8. α-Methoxy-α-t-butylperoxyethyl benzene | 1.4841 | 86 | 95.6 |
| 9. 1-methoxy-1-t-butylperoxycyclopentane | ᵈ 1.4302 | ᵉ 18 | 99.4 |
| 10. 1-methoxy-1-t-butylperoxycyclohexane | 1.4396 | 84 | 98.3 |
| 11. 1-methoxy-1-t-butylperoxycycloheptane | 1.4496 | 68 | 98.6 |
| 12. 1-methoxy-1-t-butylperoxy-3,3,5-trimethylcyclohexane | 1.4419 | 66<br>ᵇ 85 | 104.6<br>96.5 |
| 13. 2-methyl-2-t-butylperoxytetrahydrofuran | 1.4248 | ᶠ 77 | 96.3 |
| 14. 2-methyl-2-t-butylperoxytetrahydropyran | 1.4284 | 91 | 100 |
| 15. 3,4-bis [α,α-dimethyl-α-(2'-ethoxy-2'-propylperoxy) methyl] isopropylbenzene | 1.4801 | 80 | |
| 16. 2,5-dimethyl-2,5-(2'-ethoxypropyl-2'-peroxy) hexyne-3. | 1.4821 | 74 | |
| 17. 1-ethoxy-1-t-butylperoxycyclopentane | ʰ 1.4315 | 85 | 102 |

ª B.P. 36–41° at 4–5 mm.
ᵇ Yield is quantitative, some product is lost in stripping.
ᶜ B.P. 37–39° at 3 mm.
ᵈ B.P. 28–29° at 0.5 mm.
ᵉ The crude yield was 87.6% (0.15 mole run) but assayed 116% of theory. This was separated by fractional distillation into 9.54 g. of 1,1-bis-t-butylperoxycyclopentane; active oxygen 12.23% (theory 13.00%) and 5 g. of 1-methoxy-1-t-butylperoxycyclopentane; active oxygen 8.51% (theory 8.54%).
ᶠ Prepared from 2-methyl-4,5-dihydrofuran.
ᵍ Prepared from 2-methylene tetrahydrofuran.
ʰ B.P. 38–40° at 0.06 mm.

Thermal Stability of Ether Peroxides

The half-lives and specific rate constants for the decomposition of dilute benzene solutions of ether peroxides are listed in Tables 2 and 3. Determinations were at 100° unless otherwise specified. The half-lives of some well-known peroxides are included for comparison.

In Table 2 are listed those derivatives of α-sub ethers for which comparable vinyl ether derivatives have been prepared. In Table 3 are those derivatives for which there are no comparable vinyl ether derivatives.

TABLE 2

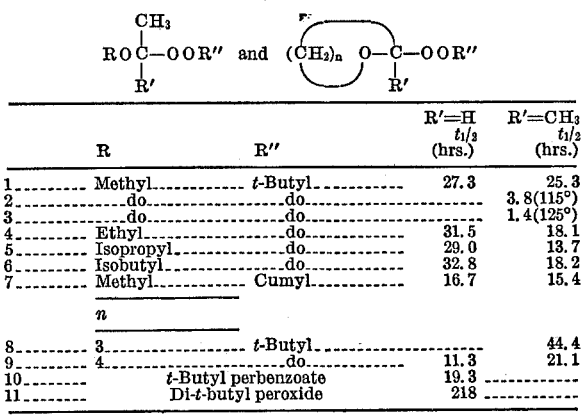

| | R | R'' | R'=H $t_{1/2}$ (hrs.) | R'=CH₃ $t_{1/2}$ (hrs.) |
|---|---|---|---|---|
| 1 | Methyl | t-Butyl | 27.3 | 25.3 |
| 2 | do | do | | 3.8(115°) |
| 3 | do | do | | 1.4(125°) |
| 4 | Ethyl | do | 31.5 | 18.1 |
| 5 | Isopropyl | do | 29.0 | 13.7 |
| 6 | Isobutyl | do | 32.8 | 18.2 |
| 7 | Methyl | Cumyl | 16.7 | 15.4 |

| | n | | | |
|---|---|---|---|---|
| 8 | 3 | t-Butyl | | 44.4 |
| 9 | 4 | do | 11.3 | 21.1 |
| 10 | | t-Butyl perbenzoate | 19.3 | |
| 11 | | Di-t-butyl peroxide | 218 | |

TABLE 3

| Ether peroxide | $t_{1/2}$ (hrs.) |
|---|---|
| 1. 1-methoxy-1-t-butylperoxy cyclopentane | 1.68 |
| 2. 1-methoxy-1-t-butylperoxy cyclohexane | 2.8 |
| 3. 1-methoxy-1-t-butylperoxy cycloheptane | 4.9 |
| 4. 1-methoxy-1-t-butylperoxy-3,3,5-trimethylcyclohexane | 3.2 |
| 5. α-Methoxy-α-t-butylperoxyethyl benzene | 16.1 |

It can be seen from Table 2 that the products from α sub vinyl ethers are less thermally stable than from the corresponding unsubstituted vinyl ether (with the exception of 2 - methyl-2-t-butylperoxy-tetrahydropyran). This is not unreasonable since a methyl group (R' in Table 2) has a larger Inductomeric effect than a hydrogen atom.

It can be seen from Table 3 that the cyclic compounds are far less stable than the acyclic compounds of Table 2. Ring strain is not the entire explanation since cyclohexane is essentially free of strain and thus the half-life of 1-methoxy-1-t-butyl peroxycyclohexane would be expected to be close to that of 2-methoxy-2-t-butylperoxypropane. Also the cycloheptane derivative should be less rather than more stable than the cyclohexane derivative.

Polymerization Studies

The ether peroxides were evaluated as initiators for styrene polymerization. Most of the work was bulk polymerization at 100° C. and was followed by dilatometry. The remainder of the work was on suspension polymerization of styrene. In this work t-butyl perbenzoate was used as a standard and assigned a relative efficiency of 1.00. The initiator concentration used in all this work was $5 \times 10^{-4}$ mole per deciliter. The polymerization data are summarized in Tables 4 and 5.

TABLE 4.—STYRENE POLYMERIZATION AT 100° C.

Peroxide $$RO\underset{R'}{\overset{CH_3}{C}}-OOR'' \text{ or } (CH_2)_n\ O-\underset{R'}{C}=C-OOR''$$

| | | | Relative efficiency of— | |
|---|---|---|---|---|
| | R | R'' | R'=H | R'=CH₃ |
| 1 | Methyl | t-Butyl | 0.68 | 1.14 |
| 2 | Isopropyl | do | 0.72 | 0.80 |
| 3 | Isobutyl | do | 0.74 | 0.76 |
| 4 | Methyl | Cumyl | 0.80 | 1.37 |

| | n | | | |
|---|---|---|---|---|
| 5 | 3 | t-Butyl | | 0.90 |
| 6 | 4 | do | 0.52 | 0.86 |

TABLE 5.—STYRENE POLYMERIZATION AT 100° C.

| Peroxide | Relative efficiency |
|---|---|
| 1. 1-methoxy-1-t-butylperoxycyclopentane | 0.73 |
| 2. 1-methoxy-1-t-butylperoxycyclohexane | 0.88 |
| 3. 1-methoxy-1-t-butylperoxycycloheptane | 0.65 |
| 4. 1-methoxy-1-t-butylperoxy-3,3,5-trimethylcyclohexane | 0.86 |
| 5. α-Methoxy-α-t-butylperoxyethylbenzene | 0.97 |

The ether peroxides of the invention as a class are fairly efficient initiators and the efficiency does not drop off appreciably at high conversion.

In all cases where comparisons can be made, the ether peroxides of the invention are *more* efficient than the unsubstituted vinyl ether products and in several examples the difference is quite large, e.g. 2-methoxy-2-t-butylperoxy propane and 2-methoxy-2-cumylperoxy propane are 70% and 55% more efficient than the corresponding products from methyl vinyl ether. Also 2-methyl-2-t-butylperoxytetrahydropyran is 65% more efficient than 2-t-butylperoxytetrahydropyran.

The relative efficiencies for the cyclic ether peroxides in Table 5 are probably conservative. The temperature at which they were evaluated is probably higher than the optimum for compounds with half-lives of 1 to 4 hours.

In Table 6, 2-methoxy-2-t-butylperoxy propane is compared with known peroxides of related structures in order to show its superiority as an initiator. The tetrahydrofuran peroxide is also compared with the known bis-peroxide of similar structure.

TABLE 6

| Peroxide | Molecular wt. | $t_{1/2}$ (100°) | Relative efficiencies of— Act. oxygen basis | Wt. basis |
|---|---|---|---|---|
| 1. t-Butyl perbenzoate | 194 | 19.3 | 1.00 | 1.00 |
| 2. 2-methoxy-2-t-butylperoxypropane | 162 | 25.3 | 1.14 | 1.33 |
| 3. α-Methoxy-α-t-butylperoxyethane | 148 | 27.3 | 0.68 | 0.89 |
| 4. 2,2-bis(t-butylperoxy) propane | 220 | 28.4 | 0.67 | 1.18 |
| 5. t-Butyl peracetate | 132 | 12.5 | .85 | 1.25 |
| 6. 2-methyl-2-t-butylperoxytetrahydrofuran (a) | 174 | 44.4 | 0.90 | 1.01 |
| 7. 2,5-dimethyl-2,5-bis(t-butylperoxy) tetrahydrofuran (b) | 276 | 35.1 | 0.66 | 0.93 |

NOTE:

(a) 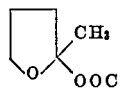  (b) 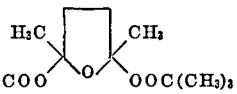

Since it was thought that our ether peroxides might be susceptible to hydrolysis and therefore useless in suspension or emulsion polymerization, a series of suspension polymerizations of styrene at 115° with three ether peroxides of t-butyl perbenzoate as a control, were carried out.

The following conclusions are drawn: The relative efficiencies of our ether peroxides drop somewhat if the pH of the suspension drops below 7. However above pH 7 the efficiency correlates exceptionally well with that obtained in high conversion bulk polymerization. The relative efficiency of 2-methoxy-t-butylperoxy propane at pH 7.2 was 1.19 compared to 1.18 as observed in high conversion bulk polymerization.

Thus our ether peroxides will complement rather than replace the peroxyesters in suspension polymerization; the peroxyesters being better on the acid side and our ether peroxides better on the alkaline side, where peroxyesters would suffer saponification.

Thus having described the invention, what is claimed is:
1. Ether peroxide having the formula $$R_3O-\underset{R_4}{\underset{|}{\overset{R_2}{\overset{|}{C}}}}-OOR_1$$

in which $R_1$ is

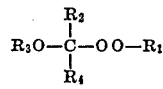

$R_2$ and $R_3$ are lower alkyl;
$R_4$ is lower alkyl or phenyl; and
$R_3$—C—$R_4$, taken together, may form a cycloalkylene ring containing 5 to 7 carbon atoms.

2. The ether peroxide of Claim 1 where $R_2$ and $R_3$ are methyl.

3. Ether peroxide having the formula $$R_3O-\underset{R_4}{\underset{|}{\overset{R_2}{\overset{|}{C}}}}-OO-R_1$$

in which $R_3$ is t-butyl;
$R_2$ is lower alkyl; and
$R_2$—C—$R_4$, taken together, form a cycloalkylene ring containing 5 to 7 carbon atoms.

4. 2-methoxy-2-cumylperoxy propane.
5. 1-methoxy-1-t-butylperoxy - 3,3,5 - trimethylcyclohexane.

References Cited

UNITED STATES PATENTS

| 3,555,099 | 1/1971 | Ballini et al. | 260—610 |
| 2,776,319 | 1/1957 | Ropp | 260—610 |
| 3,030,386 | 4/1962 | Weissermel et al. | 260—345.9 |

FOREIGN PATENTS

| 1,458,776 | 10/1966 | France | 260—610 |
| 1,078,127 | 3/1960 | Germany | 260—610 |

OTHER REFERENCES

Rigaudy et al., Academie des Sciences, May 27, 1953, pp. 2086–88.
Chem. Abstracts, vol. 66, 1967, p. 104817a.
Criegee et al., Berichte 89 1714–18 (1956).
Milas et al., J.A.C.S. 76 (1954) 2322–25.

BERNARD HELFIN, Primary Examiner
W. B. LOVE, Assistant Examiner

U.S. Cl. X.R.

260—345.9, 93.55, 347.8

UNITED STATES PATENT OFFICE
CERTIFICATE OF CORRECTION

Patent No. 3,822,317        Dated July 2, 1974

Inventor(s) Antonio Joseph D'Angelo, et al

It is certified that error appears in the above-identified patent and that said Letters Patent are hereby corrected as shown below:

Column 2, Line 25, Insert after the word "isopropyl." --- It is preferred that $R_4$ be lower alkyl, cyclohexyl, or phenyl. ---

Column 5, Table 1, No. 16, "1.4821" should read ---1.4281---.

Column 5, Table 1, No. 17, "102" should read ---120---.

Column 6, Line 47, in the formula, 
$$"C = C\underset{R'}{\overset{|}{-}}OOR""$$
should read 
$$---C\underset{R'}{\overset{|}{-}}\diagup^{OOR"}---.$$

Column 8, line 12, "$R_3$" should read ---$R_1$---.

Column 8, line 13, "$R_2$" should read ---$R_3$---.

Signed and sealed this 11th day of March 1975.

(SEAL)
Attest:

RUTH C. MASON
Attesting Officer

C. MARSHALL DANN
Commissioner of Patents
and Trademarks